(12) United States Patent
Pust et al.

(10) Patent No.: US 7,403,354 B2
(45) Date of Patent: Jul. 22, 2008

(54) TWO LAYER WRITER HEATER USING WRITER AS ONE CURRENT LEAD

(75) Inventors: Ladislav R. Pust, Savage, MN (US); Christopher J. Rea, Edina, MN (US); Richard P. Larson, Brooklyn Park, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 523 days.

(21) Appl. No.: 11/068,315

(22) Filed: Feb. 28, 2005

(65) Prior Publication Data

US 2006/0193081 A1    Aug. 31, 2006

(51) Int. Cl.
*G11B 5/127*    (2006.01)
(52) U.S. Cl. ............................. 360/125.31; 360/125.74
(58) Field of Classification Search .......... 360/125–128
See application file for complete search history.

(56) References Cited

U.S. PATENT DOCUMENTS

| | | | | |
|---|---|---|---|---|
| 4,719,527 A * | 1/1988 | Yoshisato et al. | | 360/121 |
| 6,239,954 B1 * | 5/2001 | Segar et al. | | 360/313 |
| 6,760,191 B1 * | 7/2004 | Yan et al. | | 360/128 |
| 7,023,660 B2 * | 4/2006 | Hsiao et al. | | 360/128 |
| 7,027,248 B2 * | 4/2006 | Hamaguchi et al. | | 360/59 |
| 7,092,208 B2 * | 8/2006 | Zou et al. | | 360/128 |
| 7,133,254 B2 * | 11/2006 | Hamann et al. | | 360/126 |
| 7,187,520 B2 * | 3/2007 | Lee et al. | | 360/126 |
| 2001/0053044 A1 * | 12/2001 | Rea et al. | | 360/123 |
| 2003/0231435 A1 * | 12/2003 | Kong et al. | | 360/317 |
| 2004/0027709 A1 * | 2/2004 | Hamaguchi et al. | | 360/59 |
| 2004/0027728 A1 * | 2/2004 | Coffey et al. | | 360/313 |
| 2004/0179299 A1 * | 9/2004 | Sasaki et al. | | 360/128 |
| 2004/0240109 A1 * | 12/2004 | Hamann et al. | | 360/126 |
| 2005/0018347 A1 * | 1/2005 | Hsiao et al. | | 360/128 |
| 2005/0018348 A1 * | 1/2005 | Lille et al. | | 360/128 |
| 2005/0024773 A1 * | 2/2005 | Lille | | 360/128 |
| 2005/0024774 A1 * | 2/2005 | Fontana et al. | | 360/128 |
| 2005/0094316 A1 * | 5/2005 | Shiramatsu et al. | | 360/234.5 |
| 2005/0117242 A1 * | 6/2005 | Taguchi | | 360/59 |
| 2005/0190496 A1 * | 9/2005 | Hamann et al. | | 360/128 |
| 2005/0254171 A1 * | 11/2005 | Ota et al. | | 360/128 |
| 2006/0028765 A1 * | 2/2006 | Coffey et al. | | 360/128 |
| 2007/0035594 A1 * | 2/2007 | Brooks et al. | | 347/85 |
| 2007/0035881 A1 * | 2/2007 | Burbank et al. | | 360/234.3 |

FOREIGN PATENT DOCUMENTS

JP        2004288290 A    * 10/2004

* cited by examiner

*Primary Examiner*—Andrea Wellington
*Assistant Examiner*—Jason M Garr
(74) *Attorney, Agent, or Firm*—Kinney & Lange P.A.

(57) ABSTRACT

A transducing device includes a writer having a pole tip region and a heater circuit. The heater circuit has a heating portion and a heater current return path. The heating portion has at least two branches positioned with respect to the writer so that current flowing through the at least two branches heat the writer. The heater current return path is electrically connected to the at least two branches of the heating portion near the pole tip region and includes an electrically conductive portion of the writer.

19 Claims, 6 Drawing Sheets

TWO LAYER WRITER HEATER USING WRITER AS ONE CURRENT LEAD

BACKGROUND OF THE INVENTION

The present invention relates generally to a transducing device that includes a heating portion.

In a magnetic data storage and retrieval system, a magnetic head typically includes a writer portion for storing magnetically-encoded information on magnetic media and a reader portion for retrieving the magnetically-encoded information from the magnetic media. The reader portion typically includes a bottom shield, a top shield, and a magnetoresistive sensor positioned between the bottom and top shields.

The writer portion typically includes a write pole and one or two return poles (in the case of a perpendicular writer) or a top pole and a bottom pole (in the case of a longitudinal writer). The poles are separated from each other at an air bearing surface (ABS) of the writer by a gap layer, and are connected to each other at a region distal from the ABS by a back gap closer or back via. Positioned between the poles are one or more layers of conductive coils encapsulated by an insulating layer. The writer portion and the reader portion can be arranged in a merged configuration in which layers are shared between the two elements or in a piggy-back configuration in which layers are not shared between the two elements.

To write data to the magnetic media, an electrical current is caused to flow through the conductive coils to thereby induce a magnetic field in the poles. By reversing the direction of the current through the coils, the polarity of the data written to the magnetic media is also reversed.

During operation of the magnetic data storage and retrieval system, the magnetic head is positioned in close proximity to the magnetic media. The distance between the magnetic head and the media is preferably small enough to allow for writing to and reading from the magnetic media with a large areal density, and great enough to prevent contact between the magnetic media and the magnetic head. Performance of the magnetic head depends primarily upon head-media spacing (HMS). Pole-tip recession/protrusion (PTR) at the air bearing surface is considered to be a primary technical gap for meeting required HMS targets. Control of the overall PTR performance is critical in magnetic head designs.

The layers of the magnetic head, which include both metallic and insulating layers, all have mechanical and chemical properties that are different from the substrate. The differences in properties affect several aspects of the magnetic head, including pole-tip protrusion (PTR) of the metallic layers of the magnetic head with respect to the substrate at the ABS of the magnetic head. Two components of PTR exist, thermal pole tip protrusion (TPTR) and current-induced pole tip protrusion (CPTR). TPTR arises from isothermal (global) temperature changes in the magnetic head during drive operation. TPTR is proportional to the difference in coefficients of thermal expansion ($\Delta$CTE) between the magnetic head and substrate materials. Many novel proposals have been made to reduce the TPTR magnitude using low CTE materials, reduced metal material volumes, and compensation schemes.

CPTR results from localized joule heating during application of currents to the writer coil and the resultant heat dissipation into the surrounding components of the magnetic head. CPTR, in contrast to TPTR, is proportional to the first order of the $\Delta$T(CTE) product, where $\Delta$T is the localized temperature rise in the writer core and the CTE is the coefficient of thermal expansion of the insulator material. In principle, CPTR can be reduced by improving thermal conduction away from the coil and the surrounding core structure so that the localized temperature rise is diminished. Replacing the insulator materials with high-thermal conductivity materials is a theoretically straightforward way to optimize the core for thermal dissipation. However, this is difficult due to a processing requirement of filling the coil structure.

To compensate for localized pole tip protrusion, a single-layer heater element is positioned in some magnetic heads either in close proximity to or inside the magnetic writer to heat the magnetic writer to reduce the HMS by controlled thermal expansion. By controlled heating of the writer, thermal expansion of the writer can be controlled to compensate for changes in fly height. One problem with this method is that a significant amount of current must flow through the heater element in order to generate enough heat to effect thermal protrusion.

Additionally, the current path must be designed such that current flowing through the heating element does not form a loop around the magnetic writer and generate a significant magnetic flux. If a significant magnetic flux is generated around the write pole by the heating element, the magnetic flux can result in either inadvertent writing to the magnetic media or inadvertent erasing of data already written to the magnetic media. To ensure that magnetic flux of the remnant write pole is not generated at the write pole, the current flowing in the single-layer heater element must pass along only one side of the via of the magnetic writer.

BRIEF SUMMARY OF THE INVENTION

The present invention provides a transducing device. The device includes a writer having a pole tip region and a heater circuit. The heater circuit has a heating portion and a heater current return path. The heating portion has at least two branches positioned with respect to the writer so that current flowing through the at least two branches heat the writer. The heater current return path is electrically connected to the at least two branches of the heating portion near the pole tip region and includes an electrically conductive portion of the writer.

The present invention further provides a heater for heating a magnetic writer having at least two poles connected by a via. The heater comprises a heating element carrying current symmetrically through a first conductor and a second conductor of the heating element. A portion of the first conductor is positioned at a first side of the via and a portion of the second conductor is positioned at a second side of the via. The heater also comprises a heater current return path, including a portion of the writer, in a plane generally parallel to the heating element. The heater current return path is electrically connected to the first and second conductor.

The present invention further provides a transducing device having at least two metallic layers and a via connecting at least two of the metallic layers. The transducing device comprises a heater circuit and a heater current return path. The heater circuit has a first layer that has a first branch and a second branch. A portion of the first branch and a portion of the second branch pass on opposite sides of the via in order to control thermal expansion of the writer by heating at least one metallic layer of the at least two metallic layers. The heater current return path is in a plane separate from the first layer and generally parallel to the first layer. The heater current return path is electrically connected to the first layer proximate a pole tip region of the transducing device.

DETAILED DESCRIPTION

Figure 1:
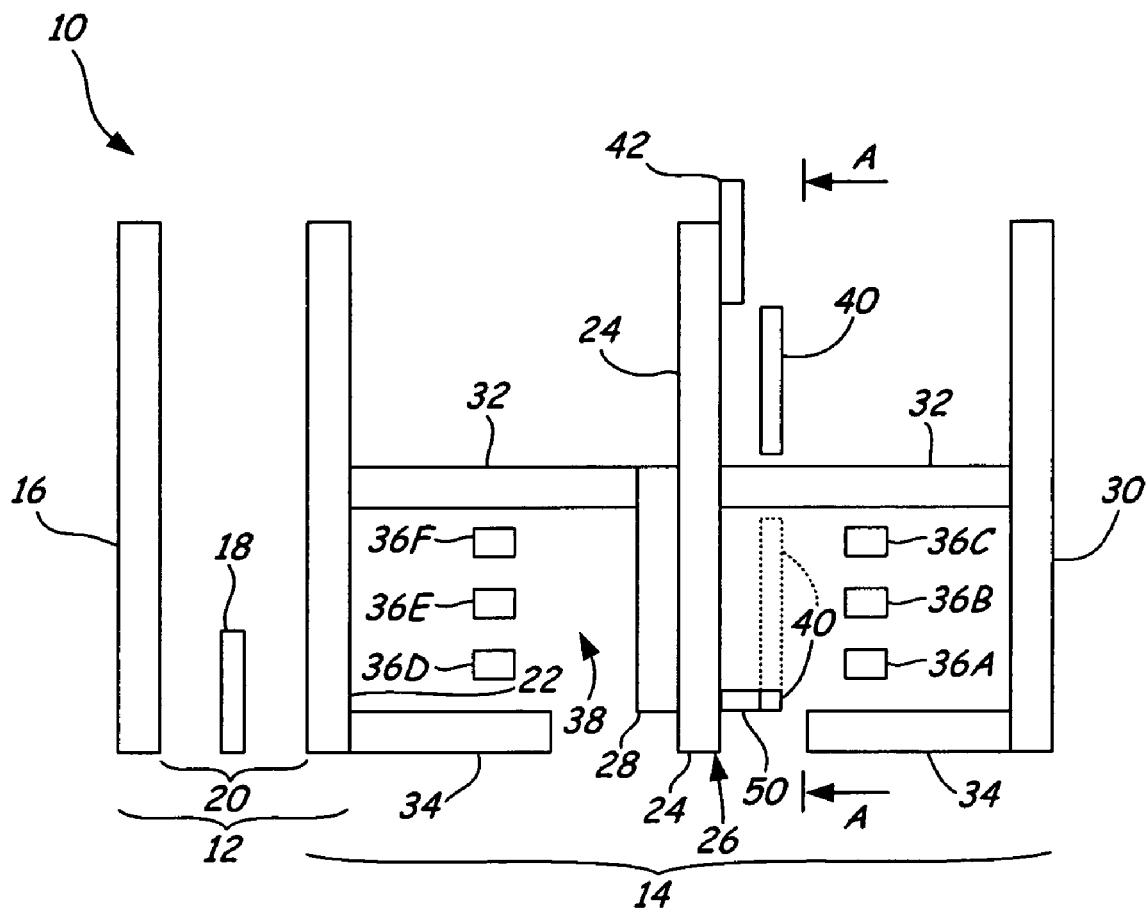
FIG. 1 is a cross-sectional view of a magnetic head of the present invention.

FIG. 1 is a sectional view of magnetic head 10 having a two-layer heater in accord with the present invention. Magnetic head 10 generally comprises a reader 12 and a writer 14, shown in FIG. 1 in a merged configuration. Reader 12 includes bottom shield 16, read element 18, read gap 20, and shared pole 22 (which acts as both a top shield and a return pole). Bottom shield 16 is located adjacent shared pole 22 and is spaced from shared pole 22 by read gap 20. Bottom shield 16 and shared pole 22 are formed from metallic materials, preferably from an alloy composed primarily of Fe, Ni, and/or Co. The metallic alloys typically have a large CTE. For example, a composition with about 80% Ni-20% Fe or 79% Ni-21% Fe has a CTE in the range of about $10.0 \times 10^{-6}/°$ C. to $13.0 \times 10^{-6}/°$ C.

Read element 18 is positioned in read gap 20 between bottom shield 16 and shared pole 22 adjacent an air-bearing surface (ABS) of magnetic head 10. Read gap 20 is defined on the ABS between terminating ends of bottom shield 16 and shared pole 22 and serves to insulate read element 18 from both bottom shield 16 and shared pole 22. In operation, magnetic flux from a surface of a magnetic media causes rotation of a magnetization vector of read element 18, which in turn causes a change in electrical resistivity of read element 18. The change in resistivity of read element 18 can be detected by passing a current through read element 18 and measuring a voltage across read element 18. Other magnetic sensing technologies may also be used in the read element. Read element 18 can be any type of read element, such as an anisotropic magnetoresistive (AMR) read element, a giant magnetoresistive (GMR) read element, or a tunneling giant magnetoresistive (TGMR) read element. Read gap 20 is generally formed of an insulating material, such as $Al_2O_3$.

Writer 14 includes shared pole 22, write pole 24, write pole tip 26 located at an end of write pole 24 at the ABS, yoke 28, return pole 30, back via 32, front shields 34, write coil 36 (shown as upper coil turns 36A, 36B, and 36C and lower coil turns 36D, 36E, and 36F), insulator 38, first heater layer 40, and grounding connection 42. Although magnetic head 10 is shown having two return poles (i.e. shared pole 22 and return pole 30), writer 14 may have only one return pole without departing from the intended scope of the invention. Shared pole 22, write pole 24, and return pole 30 extend from the ABS and are connected to each other distal from the ABS by back via 32. Yoke 28 is formed on write pole 24 and is also connected to back via 32, but does not extend the full length of write pole 24. Front shields 34 are connected to shared pole 22 and return pole 30 adjacent the ABS and extend toward write pole tip 26. Front shields 34 can be eliminated from writer 14 without departing from the intended scope of the invention. Insulator 38 separates shared pole 22, write pole 24, and return pole 30 from each other and from coil 36.

Shared pole 22, yoke 28, return pole 30, back via 32, and front shield 34 are formed from metallic ferromagnetic materials. Preferably, each of these components is formed from an alloy composed primarily of Fe, Ni, and/or Co. The metallic alloys typically have a large CTE. For example, a composition with about 80% Ni-20% Fe or 79% Ni-21% Fe has a CTE in the range of about $10.0 \times 10^{-6}/°$ C. to $13.0 \times 10^{-6}/°$ C.

As shown in FIG. 1, coil 36 has upper coil turns 36A, 36B, and 36C and lower coil turns 36D, 36E, and 36F. Upper coil turns 36A, 36B, and 36C are positioned between write pole 24 and return pole 30, and lower coil turns 36D, 36E, and 36F are positioned between shared pole 22 and write pole 24. Coil turns 36A, 36B, 36C, 36D, 36E, and 36F wrap around write pole 24 such that the flow of electrical current through conductive coil 36 generates a magnetic flux at write pole tip 26. In one configuration, coil 36 may be wrapped in the following order: 36A to 36D to 36B to 36E to 36C to 36F. Although FIG. 1 shows coil 36 to be wrapped in a helical configuration, other configurations can be used without departing from the scope of the intended invention. Each individual coil section 36A, 36B, 36C, 36D, 36E, and 36F is separated from one another and from shared pole 22, write pole 24, return pole 30, and back via 32 by insulator 38. Coil 36 is generally formed from an electrically-conductive metal, such as Cu, Au, or Ag. Most commonly used is Cu, which has a CTE in the range of about $16.0 \times 10^{-6}/°$ C. to $18.0 \times 10^{-6}/°$ C.

Insulator 38 surrounds coil 36 and is preferably formed from a dielectric material with high thermal conductivity to facilitate the removal of heat from coil 36 via shared pole 22, write pole 24, and return pole 30. Insulator 38 is preferably formed from $Al_2O_3$ or a photoresist having a large CTE.

First heater layer 40 is connected by electrical connection 50 to write pole 24 and serves to supply heat to writer 14 in predetermined locations in order to control thermal protrusion and the shape of writer 14 at the ABS. Heater current flows through first heater layer 40, through electrical connection 50 to a return path including write pole 24, and to connection 42. Although first layer heater 40 is depicted in FIG. 1 as connecting to write pole 24, first heater layer 40 does not have to connect to write pole 24 but can also connect to other elements, such as shared pole 22, yoke 28, return pole 30, and front shields 34 that form a return current path to connection 42. First heater layer 40 can be placed between write pole 24 and upper coil turns 36A, 36B, and 36C, between write pole 24 and lower coil turns 36D, 36E, and 36F, between upper coil turns 36A, 36B, and 36C and return pole 30, or between shared pole 22 and lower coil turns 36D, 36E, and 36F. Heater layer 40 is formed from highly resistive alloys, preferably an alloy composed primarily of Cr, W, or Ta. First heater layer 40 is shown in phantom in FIG. 1 because first heater layer 40 must be positioned relative to write pole 24 (as discussed above) such that first heater layer 40 does not induce a net magnetic field in writer 14. Thus, depending on where first heater layer 40 is positioned in writer 14, first heater layer 40 may or may not be visible from a sectional view.

Connection 42 is connected to a grounded bond pad at a first end and to write pole 24 at a second end and operatively connects write pole 24 to the grounded bond pad. Although connection 42 is depicted as connected to write pole 24 in FIG. 1, current can pass through other elements without departing from the intended scope of the invention. For example, connection 42 can be connected to back via 32 with current passing through back via 32 and return pole 30.

Although FIG. 1 illustrates magnetic head 10 having a perpendicular writer and the invention discusses the invention primarily with respect to a perpendicular writer, the present invention may be used in both a perpendicular writer as well as a longitudinal writer. In cases involving a longitudinal writer, the write pole is replaced with a top pole. In addition, shared pole 22 can also include multiple layers, including a top shield, a non-magnetic layer, and a bottom pole.

Figure 2:
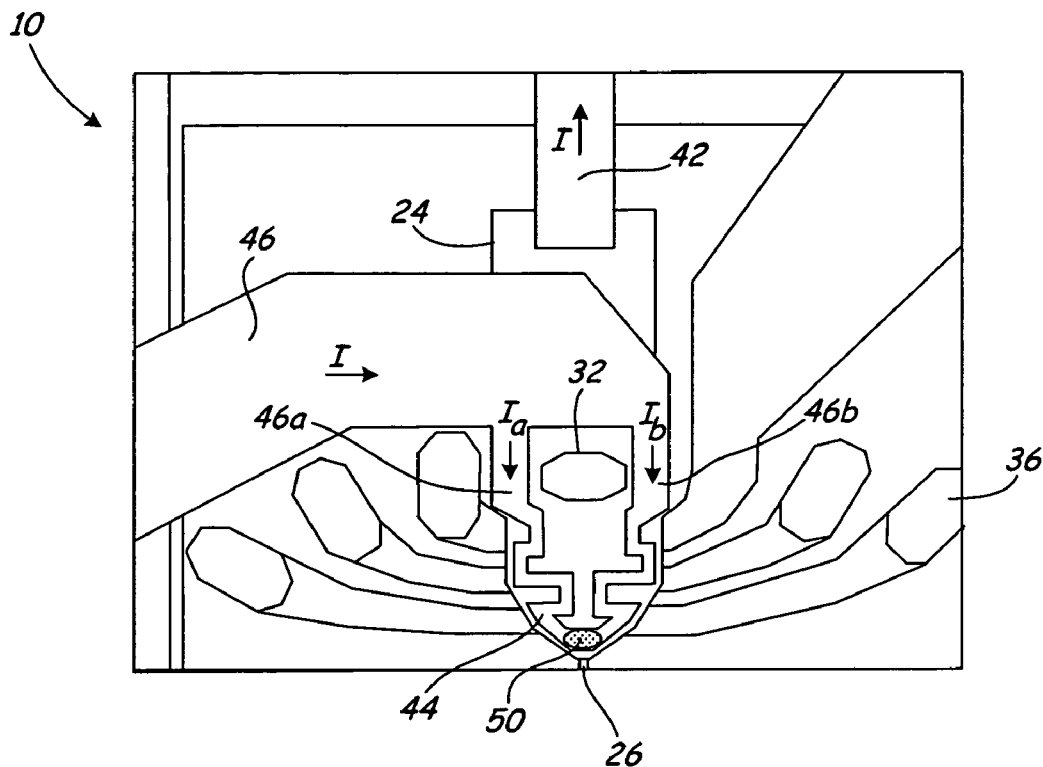
FIG. 2 is a top view of a first embodiment of the magnetic head of the present invention taken along line A-A of FIG. 1.

FIG. 2 is a sectional view of a first embodiment of magnetic head 10 of the present invention taken along line A-A of FIG. 1 with insulator 38 removed. FIG. 2 shows write pole 24, write pole tip 26, back via 32, coil 36 wrapped around write pole 24, connection 42, heater layer 40 (shown in FIG. 1) comprising heater turns 44 and first heater lead 46, and electrical connection 50. First heater lead 46 splits into a first branch 46a and a second branch 46b positioned on opposite sides of back via 32 between write pole 24 and upper coil turns 36A, 36B, and 36C (not shown in FIG. 2) and extending to write pole tip 26. Voltage applied to a heater voltage bond pad causes current I to flow in first heater lead 46. Current I splits into currents $I_a$ and $I_b$ as it passes through first branch 46a and second branch 46b, respectively. The resistances of first branch 46a and second branch 46b are approximately equal so that currents $I_a$ and $I_b$ are approximately equal. In turn, heat generated from currents $I_a$ and $I_b$ passing through heater turns 44 in first branch 46a and second branch 46b provides localized heating in writer 14. The heating can be controlled and tuned by the configuration of heater turns 44 in writer 14. Typically, heater turns 44 of first heater branch 46a and heater turns 44 of second heater branch 46b are mirror images of each other so that the overall controlled thermal expansion of writer 14 is symmetrical at the ABS. Heater turns 44 of first heater branch 46a and second heater branch 46b are mirror images of each other and currents $I_a$ and $I_b$ passing through heater turns 44 of first heater branch 46a and second heater branch 26b are approximately equal so that writing and erasing at write pole 24 is either greatly reduced or eliminated. The controlled localized heating of writer 14 results in controlled pole tip protrusion around write pole 24 as pole tip protrusion of the ABS around write pole tip 26 is shaped as needed while ensuring that a magnetic flux is not produced.

First branch 46a and second branch 46b rejoin at electrical connection 50, which electrically connects first heater lead 46 to one or more components of writer 14 to create a heater current return path (HCRP), or the second layer of the two-layer heater. Electrical connection 50 may be connected to shared pole 22, write pole 24, yoke 28, return pole 30, or front shields 34 (shared pole 22, yoke 28, return pole 30, and front shields 34 shown in FIG. 1). The location of first branch 46a, second branch 46b, and electrical connection 50 in writer 14 will determine which of write pole 24, yoke 28, shared pole 22, return pole 30, or front shield 34 is more practical to use as the HCRP. Electrical connection 50 is formed of a non-magnetic material, preferably Cu.

The HCRP serves as the return path for current I in a different layer than first heater lead 46. It can either be electrically insulated from or connected to other components of writer 14. It also can be grounded, depending on the particular electrical design of the two-layer heater. The two-layer heater configuration of magnetic head 10 allows current to be passed and returned through writer 14 without creating a magnetic flux around write pole 24. Although in FIG. 2 and following embodiments current I is shown as flowing from first heater lead 46 and passing through connection 42, current I may travel through other paths without departing from the intended scope of the invention. For example, current I may flow from first heater lead 46 through back via 32 and exit through yoke 28.

In the first embodiment of magnetic head 10, heater turns 44 of first branch 46a and second branch 46b are configured such that currents $I_a$ and $I_b$ passing through first branch 46a and second branch 46b, respectively, generate more heat close to the ABS, where cooling occurs at a rapid rate, and generate less heat further away from the ABS, where cooling occurs at a slow rate. This embodiment of magnetic head 10 provides heated volume with more uniform temperature throughout writer 14.

Figure 3:
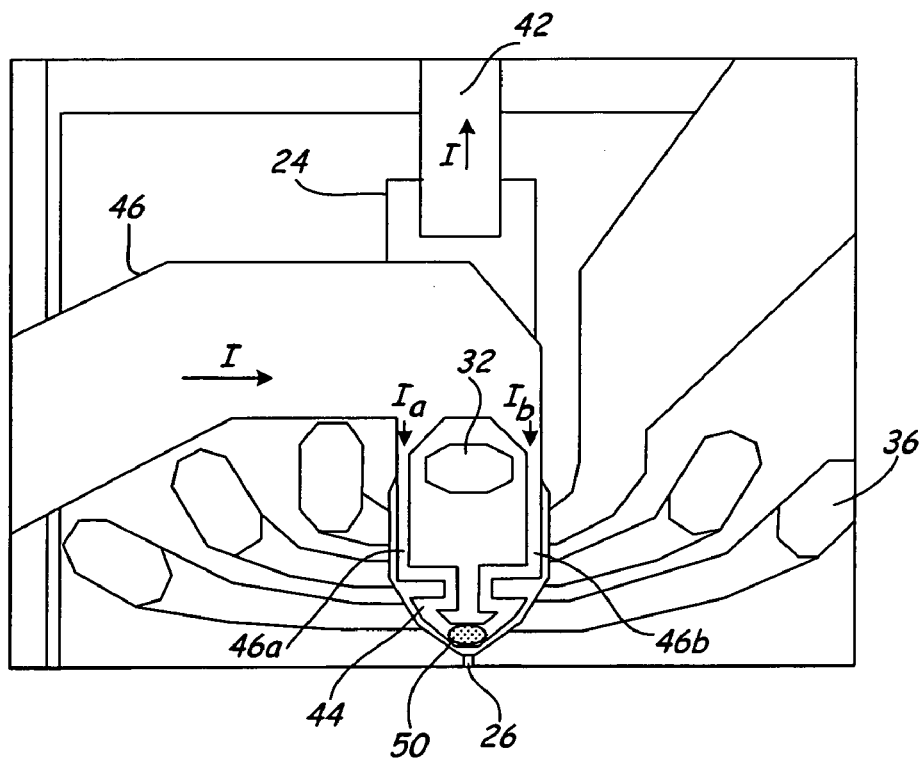
FIG. 3 is a top view of a second embodiment of the magnetic head of the present invention taken along line A-A of FIG. 1.

FIG. 3 is a sectional view of a second embodiment of magnetic head 10 of the present invention taken along line A-A of FIG. 1. In this embodiment, heater turns 44 of first branch 46a and second branch 46b are positioned in writer 14 to generate heat primarily close to the ABS and generate much less heat further from the ABS. This configuration provides very localized heated volume close to the ABS.

Figure 4:
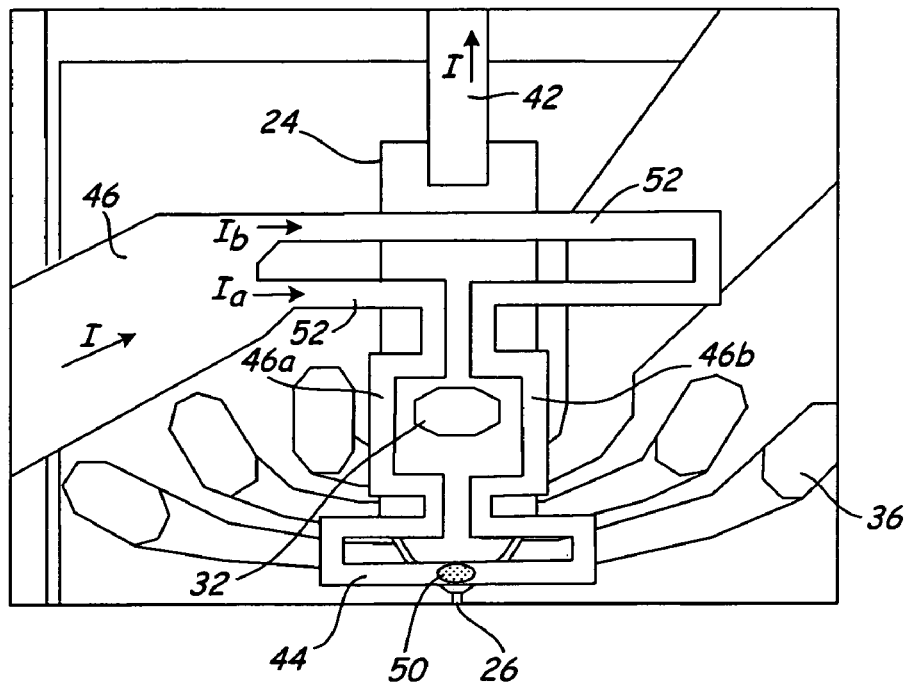
FIG. 4 is a top view of a third embodiment of the magnetic head of the present invention taken along line A-A of FIG. 1.

FIG. 4 is a sectional view of a third embodiment of magnetic head 10 of the present invention taken along line A-A of FIG. 1. In this embodiment, first branch 46a and second branch 46b comprise heater turns 44 as well as resistive heater turns 52, which are positioned behind back via 32 relative to write pole tip 26. Heater turns 44 are positioned in writer 14 to generate heat close to the ABS in larger volume for a larger, or wider, protruded ABS area. Resistive heater turns 52 are placed behind back via 32 to generate large heated volume behind back via 32. Combined, heater turns 44 and resistive heater turns 52 provide a large magnitude of protrusion at the ABS due to large expanding volume.

Figure 5:
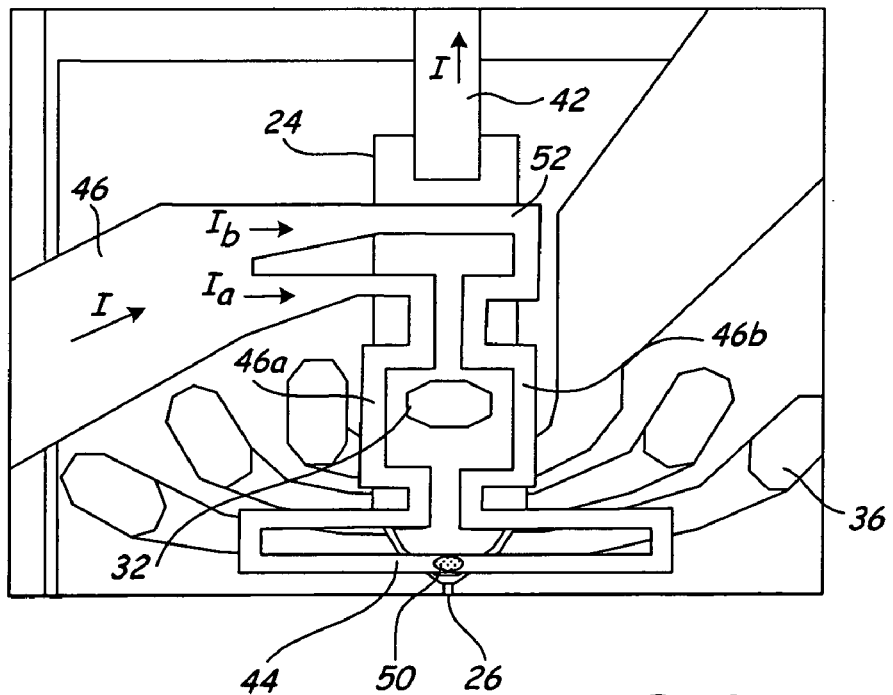
FIG. 5 is a top view of a fourth embodiment of the magnetic head of the present invention taken along line A-A of FIG. 1.

FIG. 5 is a sectional view of a fourth embodiment of magnetic head 10 of the present invention taken along line A-A of FIG. 1. Heater turns 44 and resistive heater turns 52 of first branch 46a and second branch 46b are configured such that currents $I_a$ and $I_b$ passing through first branch 46a and second branch 46b, respectively, generate more heat at the ABS and less heat behind back via 32, similar to heater turns 44 and resistive heater turns 52 in FIG. 4. However, this fourth embodiment of magnetic head 10 is configured to generate even more heat at the ABS and less heat behind back via 32.

Figure 6:
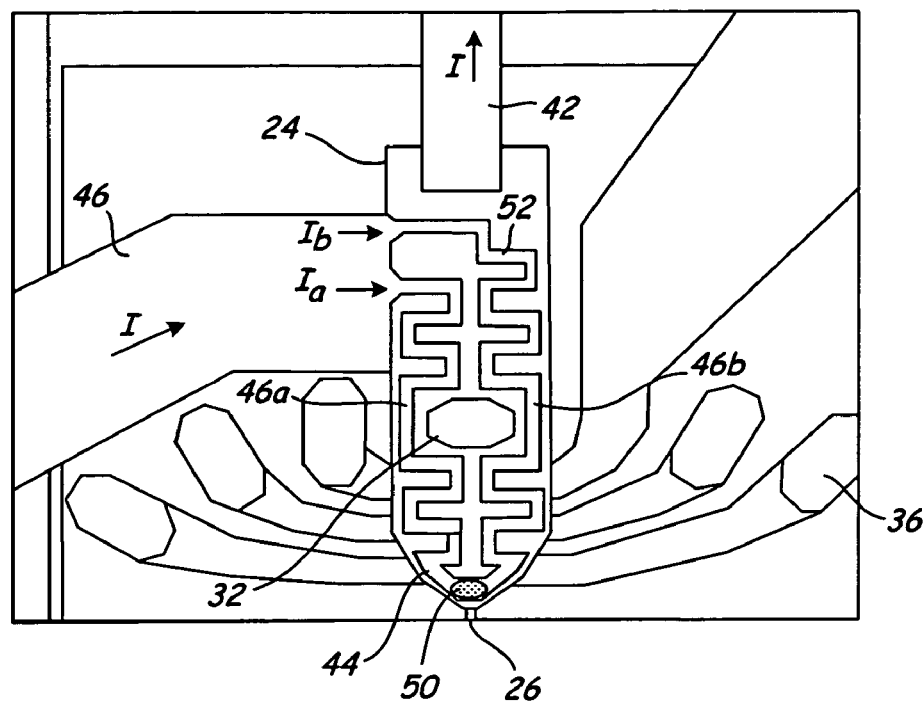
FIG. 6 is a top view of a fifth embodiment of the magnetic head of the present invention taken along line A-A of FIG. 1.

FIG. 6 is a sectional view of a fifth embodiment of magnetic head 10 of the present invention taken along line A-A of FIG. 1. In this embodiment of the two-layer heater, heater turns 44 of first branch 46a and second branch 46b are positioned to form a narrow column of heat. This configuration of heater turns 44 and resistive heater turns 52 provides more localized protrusion with larger protrusion amplitude at the ABS. Although the configurations of the two-layer heater shown in FIGS. 2-6 show heater turns 44 and resistive heater turns 52 of first branch 46a and second branch 46b as 90° turns, heater turns 44 and resistive heater turns 52 may be any variety of shapes, such as rounded, without departing from the scope of the invention, as will be apparent to those skilled in the art.

Figure 7:
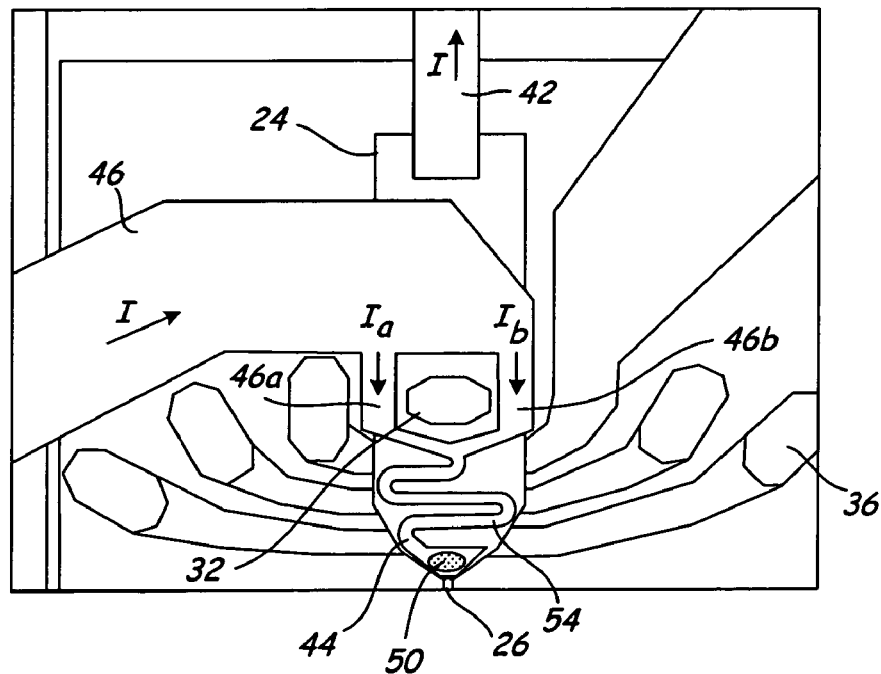
FIG. 7 is a top view of a sixth embodiment of the magnetic head of the present invention taken along line A-A of FIG. 1.

FIG. 7 is a sectional view of a sixth embodiment of magnetic head 10 of the present invention taken along line A-A of FIG. 1. In this embodiment, heater turns 44 of first branch 46a and second branch 46b are rounded and first heater lead 46 only branches into first branch 46a and second branch 46b to get around back via 32. After first branch 46a and second branch 46b have gone around back via 32, first branch 46a and second branch 46b meet and combine to form a single branch 54 closer to the ABS, where most of the heat is generated before connecting to electrical connection 50.

Figure 8:
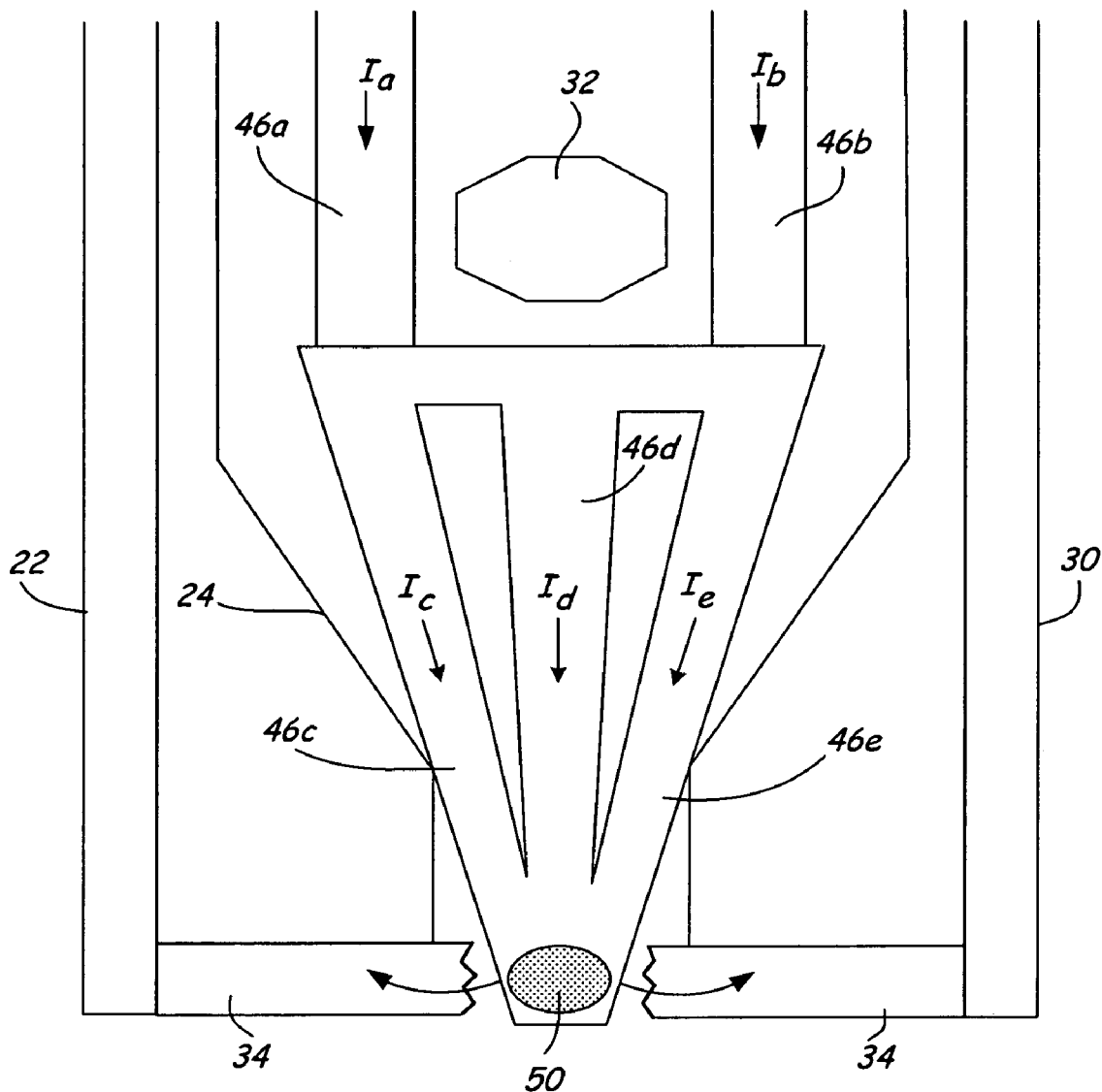
FIG. 8 is an enlarged top view of a section of the magnetic head of the present invention at the air bearing surface having a pitchfork configuration.

FIG. 8 is an enlarged top view of a section of writer 14 at the ABS illustrating magnetic head 10 using front shield 34 as part of the HCRP. The remainder of the return path includes shared pole 22 and return pole 30. After first heater lead 46 (not shown in FIG. 8) branches into first branch 46a and second branch 46b to go around back via 32, first heater lead 46 branches into third branch 46c, fourth branch 46d, and fifth branch 46e in a pitch fork configuration, which meet at electrical connection 50. Current I is split and passed through third branch 46c, fourth branch 46d, and fifth branch 46e as $I_c$, $I_d$, and $I_e$, respectively. Currents $I_a$ and $I_b$ pass through first branch 46a and second branch 46b as discussed in previous embodiments of magnetic head 10, and currents $I_c$, $I_d$, and $I_e$ flow through third branch 46c, fourth branch 46d, and fifth branch 46e, respectively.

Currents $I_c$, $I_d$, and $I_e$ combine at electrical connection 50 and pass through front shield 34. This heater configuration generates heat in a smaller area as third branch 46c, fourth branch 46d, and fifth branch 46e get closer to the ABS. Each of third branch 46c, fourth branch 46d, and fifth branch 46e decreases in cross-sectional area in order to produce the most efficient use of heat that produces the same amount of thermal expansion as other configurations, but limiting the possibility of electromigration. In this embodiment, front shield 34 is used as one electrical lead. This pitchfork configuration using front shield 34 as the HCRP can be fabricated by a variety of methods, as discussed in relation to FIGS. 8A, 8B, and 8C.

Figure 8A:
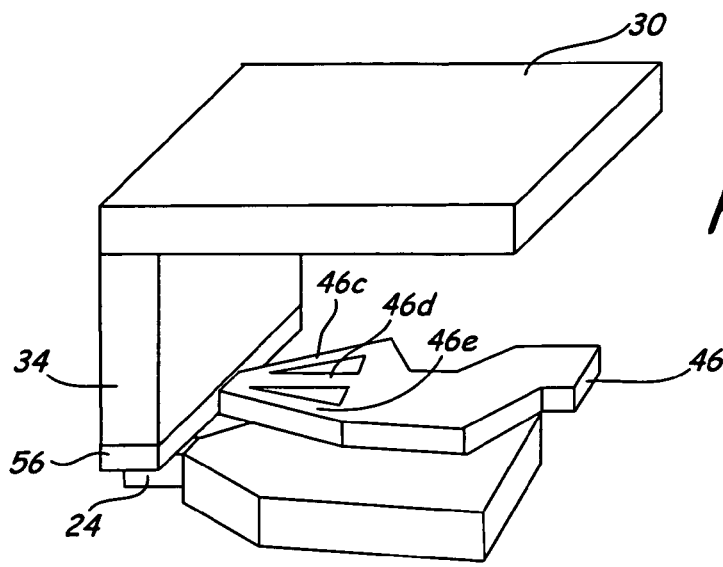
FIG. 8A is an enlarged cross-sectional view of a first embodiment of the pitchfork configuration of the present invention shown in FIG. 8.

FIG. 8A is an enlarged cross-sectional view of the section of writer 14 shown in FIG. 8 illustrating a first embodiment of the pitchfork configuration. In the first embodiment, heater layer 46 is fabricated out of a seedlayer 56, which is electrically isolated from all elements other than front shield 34. Seedlayer 56 is ion milled to create the pitchfork configuration and is used as part of the HCRP.

Figure 8B:
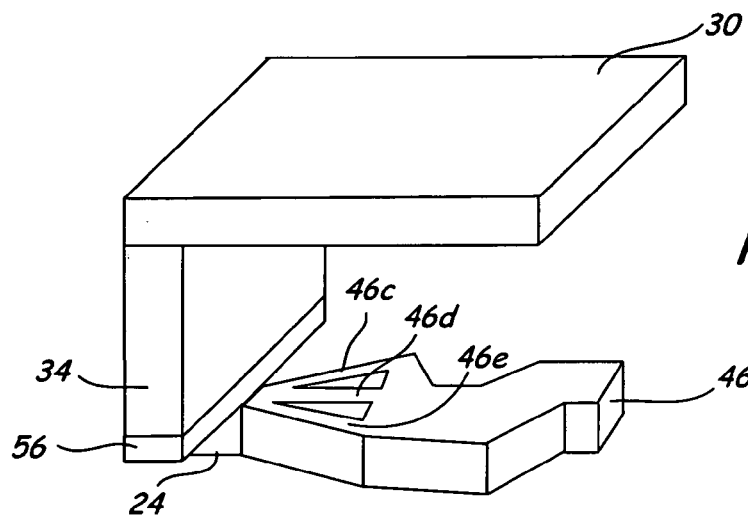
FIG. 8B is an enlarged cross-sectional view of a second embodiment of the pitchfork configuration of the present invention shown in FIG. 8.

FIG. 8B is an enlarged cross-sectional view of the section of writer 14 shown in FIG. 8 illustrating a second embodiment of the pitchfork configuration. In the second embodiment, seedlayer 56 can be patterned with front shield 34 and is in electrical contact with write pole 24 or yoke 28. In this case, write pole 24 is utilized as first heater layer 40. The HCRP will be through the write pole 24/yoke 28 region.

Figure 8C:
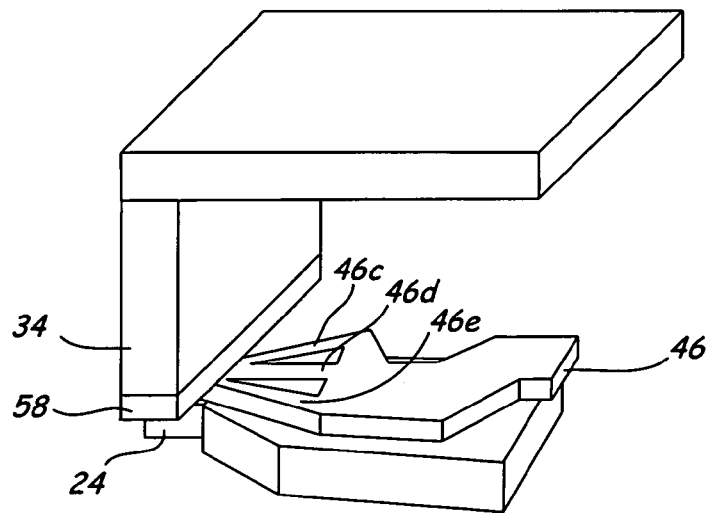
FIG. 8C is an enlarged cross-sectional view of a third embodiment of the pitchfork configuration of the present invention shown in FIG. 8.

FIG. 8C is an enlarged cross-sectional view of the section of writer 14 shown in FIG. 8 illustrating a third embodiment of the pitchfork configuration. In the third embodiment, a metallic/conducting cap layer 58 positioned above write pole 24 and yoke 28 is used as part of the HCRP. Cap layer 58 is connected to heater layer 46 and is electrically isolated from write pole 24 and yoke 28, and is electrically connected to front shield 34. Cap layer 58 lies parallel to the plane of write pole 24.

The magnetic head of the present invention comprises a two-layer heater for controlled thermal expansion of a writer. A heater lead connected to a heater voltage pad splits into two branches positioned along opposite sides of a back via and a write pole of the writer. Heat generated in the heater lead passes current through turns in the first and second branches to provide localized heating of the writer without inducing magnetic flux at the write pole that may cause writing or erasing of data on a magnetic media. The first and second branches are electrically connected close to the ABS to one or more components of the writer, which serve as a current return path. The two-layer heater of the present invention allows heat to be generated in a controlled manner to provide heat both close to the ABS and further away behind the ABS as needed to shape any pole tip protrusion around the write pole.

Although the present invention has been described with reference to preferred embodiments, workers skilled in the art will recognize that changes may be made in form and detail without departing from the spirit and scope of the invention.

The invention claimed is:

1. A transducing device comprising:
   a writer having a pole tip region; and
   a heater circuit including:
      a heating portion having at least two branches that are positioned with respect to the writer so that current flowing through the at least two branches heats the writer; and
      a heater current return path electrically connected to the at least two branches of the heating portion near the pole tip region, the heater current return path including an electrically conductive portion of the writer, wherein the heater current return path is through at least one of a write pole, a yoke, a return pole, a bottom pole, and a front shield of the writer.

2. The device of claim 1, wherein the at least two branches combine to form a single branch prior to connecting to the heater current return path.

3. The device of claim 1, wherein the at least two branches have at least two turns.

4. The device of claim 3, and wherein the writer includes at least two poles connected by a via.

5. The device of claim 4, wherein at least one turn of the at least two branches is positioned between the via and the pole tip region.

6. The device of claim 5, wherein at least one turn of the at least two branches is positioned behind the via in relation to the pole tip region.

7. The device of claim 3, wherein the turns of the at least two branches are rounded.

8. A heater for heating a magnetic writer having at least two poles connected by a via, the heater comprising:
   a heating element carrying current symmetrically through a first conductor and a second conductor, a portion of the first conductor positioned at a first side of the via and a portion of the second conductor positioned at a second side of the via so that current flow through the first and second conductors produces heating without inducing magnetic flux at a write pole; and
   a heater current return path, including a portion of the writer, in a plane generally parallel to the heating element, electrically connected to the first and second conductors.

9. A heater for heating a magnetic writer having at least two poles connected by a via, the heater comprising:
   a heating element carrying current symmetrically through a first conductor and a second conductor, a portion of the first conductor positioned at a first side of the via and a portion of the second conductor positioned at a second side of the via; and
   a heater current return path, including a portion of the writer, in a plane generally parallel to the heating element, electrically connected to the first and second conductors, wherein the heater current return path includes at least one of a write pole, a yoke, a return pole, a bottom pole, and a front shield of the magnetic writer.

10. The heater of claim 9, wherein the first and second conductors are connected to the heater current return path proximate a pole tip region of the heater.

11. The heater of claim 10, wherein the first and second conductors combine to form a single conductor prior to connecting to the heater current return path.

12. The heater of claim 11, wherein the first and second conductors have a plurality of turns.

13. The heater of claim 12, wherein the turns of the first and second conductors are rounded.

14. A transducing device comprising;
at least two metallic layers, one of the metallic layers including a write pole;
a via connecting at least two of the metallic layers;
a heater circuit having a first layer, the first layer having a first branch and a second branch, a portion of the first branch and a portion of the second branch passing on opposite sides of the via for controlling thermal expansion of the transducing device by heating at least one metallic layer of the at least two metallic layers wherein current flowing through the first and second branches produces heat without inducing magnetic flux at the write pole; and
a heater current return path in a plane separate from the first layer and generally parallel to the first layer, the heater current return path electrically connected to the first layer proximate a tip region of the transducing device.

15. A transducing device comprising;
at least two metallic layers, one of the metallic layers including a write pole;
a via connecting at least two of the metallic layers;
a heater circuit having a first layer, the first layer having a first branch and a second branch, a portion of the first branch and a portion of the second branch passing on opposite sides of the via for controlling thermal expansion of the transducing device by heating at least one metallic layer of the at least two metallic layers; and
a heater current return path in a plane separate from the first layer and generally parallel to the first layer, the heater current return path electrically connected to the first layer proximate a tip region of the transducing device, wherein the at least two metallic layers include a write pole, a yoke, a return pole, a bottom pole, and a front shield, wherein the heater current return path is through at least one of the write pole, the yoke, the return pole, the bottom pole, and the front shield.

16. The transducing device of claim 15, wherein the first and second branches have a plurality of turns.

17. The transducing device of claim 16, wherein the turns of the first and second branches are rounded.

18. The transducing device of claim 15, and further comprising a third branch electrically connected to the heater current return path proximate the tip region, a portion of the third branch passing in a plane of the write pole.

19. The transducing device of claim 15, and further comprising a coil, wherein the heater is positioned between the coil and at least one of the write pole, the return pole, and the bottom pole.

* * * * *

UNITED STATES PATENT AND TRADEMARK OFFICE
CERTIFICATE OF CORRECTION

PATENT NO. : 7,403,354 B2
APPLICATION NO. : 11/068315
DATED : July 22, 2008
INVENTOR(S) : Ladislav R. Pust et al.

It is certified that error appears in the above-identified patent and that said Letters Patent is hereby corrected as shown below:

Column 1, Line 21, delete "aback", insert --a back--

Column 3, Line 16, delete "is atop view", insert --is a top view--

Column 5, Line 21, delete "ofmagnetic", insert --of magnetic--

Column 6, Lines 31-32, delete "ofmagnetic", insert --of magnetic--

Column 7, Lines 1-2, delete "ofmagnetic", insert --of magnetic--

Signed and Sealed this

Fifth Day of May, 2009

JOHN DOLL
*Acting Director of the United States Patent and Trademark Office*